H. K. RAYMOND.
VALVE FOR PNEUMATIC TIRES.
APPLICATION FILED MAR. 1, 1906.
906,159.
Patented Dec. 8, 1908.
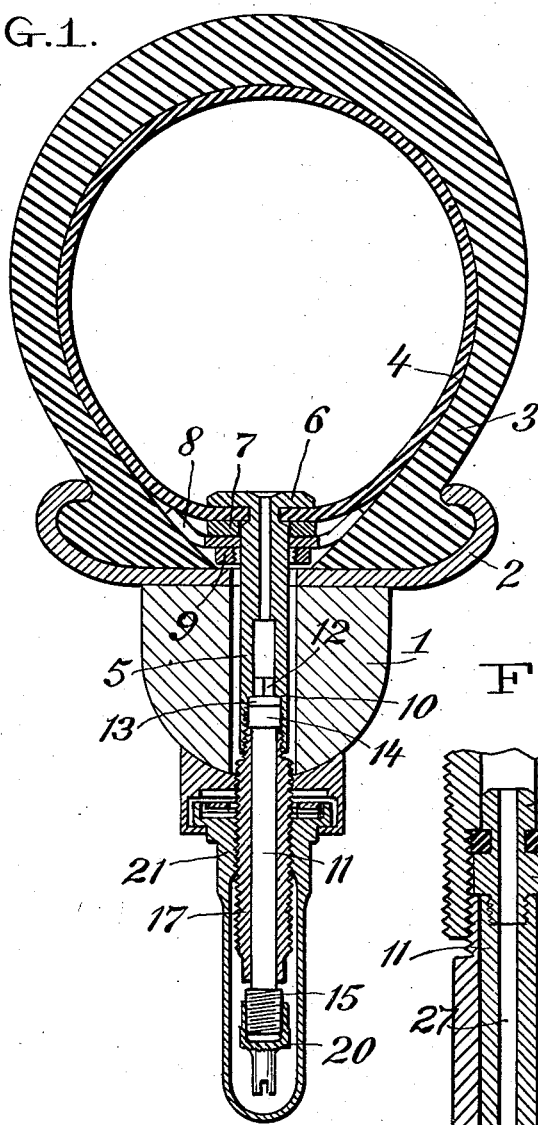
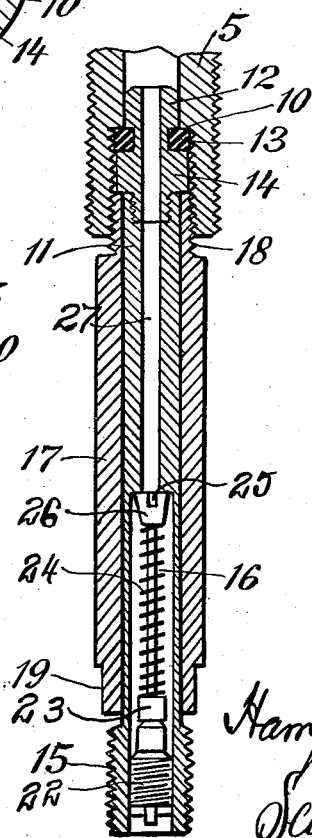
WITNESSES:
INVENTOR
Harry K. Raymond
BY
Seward Davis
ATTORNEY

UNITED STATES PATENT OFFICE.

HARRY K. RAYMOND, OF AKRON, OHIO, ASSIGNOR TO THE B. F. GOODRICH COMPANY, OF AKRON, OHIO, A CORPORATION OF OHIO.

VALVE FOR PNEUMATIC TIRES.

No. 906,159.

Specification of Letters Patent.

Patented Dec. 8, 1908.

Application filed March 1, 1906. Serial No. 303,683.

*To all whom it may concern:*

Be it known that I, HARRY K. RAYMOND, a citizen of the United States, residing in the city of Akron, county of Summit, and State of Ohio, have invented certain new and useful Improvements in Valves for Pneumatic Tires, of which the following is a specification, reference being had to the accompanying drawings, which form a part thereof.

My invention relates to that class of air valves employed as means for inflating and deflating pneumatic tires.

In the present state of the art the air valve consists of a single straight tube provided at one end with a head adapted to seat against the inner surface of the air tube and containing the valve mechanism, which is usually constructed to admit air under pressure and to prevent its escape. To allow the air to escape the valve mechanism must usually be removed entirely from the casing.

The air tube is applied to the wheel rim when the said tube is wholly or partially deflated, the valve casing being inserted in a hole provided therefor in the rim and felly. The valve casing is then forced downward until its extremity projects beyond the inner surface of the felly, the air pump attached and air forced in to fill the tube. This form of valve presents a number of serious difficulties in practice: 'For example, the head of the valve casing cannot be easily reached when the tire is upon the wheel, and it is therefore difficult to force the casing downward into place sufficiently to attach the inflating pump. To obviate this difficulty the valve casing is made considerably longer than the thickness of the felly requires, but when the valve is finally in place the casing projects unnecessarily beyond the inner surface of the felly. Moreover the great length of this stem renders the operation of applying the air tube and of inserting the valve stem into the hole provided in the rim exceedingly awkward and difficult, particularly in the case of valves adapted for use with thick or deep fellies.

The object of my invention is to provide a valve which shall have a short tube which can be forced into the hole provided for it in the rim and an extension tube sufficiently long to reach through the felly.

Another object of my invention is to provide a valve adapted to be used with fellies of different thicknesses.

A further object of my invention is to provide a valve which will permit the tire to be deflated without removing the valve mechanism from its case.

I accomplish these objects by means of the structure hereinafter described and claimed, which consists essentially of a short main tube adapted to be attached to the air tube, a removable extension tube adapted to be attached to said main tube and containing the valve mechanism, and means for securing an air tight joint between the said main tube and the said extension tube.

I have shown my device as applied to a double tube tire of the clencher type, but it is equally adapted for use with single tube tires and with other forms of double tube structures.

In the drawings Figure 1 is a cross-section of a tire, rim and felly with my improved valve used in conjunction therewith the main tube, sleeve, and dust cap being shown in section and the inner extension tube which contains the valve mechanism proper, being shown in elevation. Fig. 2 is an isometric view of the several parts of a valve, embodying my improvements. Fig. 3 is a section of the extension tube and of a portion of the main tube showing the means for securing a tight joint therebetween and showing the valve mechanism proper.

Throughout the drawings like reference numerals refer to like parts.

In Fig. 1, 1 is the wheel felly, 2 the rim attached thereto, 3 the tire-casing, and 4 the inner or air tube. The main valve tube 5 is similar to that of the ordinary tire valve, consisting of a straight tube provided with flattened sides and a head 6 adapted to seat within the air tube and to secure the tube thereto. Upon this tube may be mounted the washer 7, the clip 8, the clip-nut 9, or similar accessories which are usually carried upon valve-casings for various purposes. These, however, constitute no part of my improvement. The main tube, however, does not contain the valve mechanism, as is the case with the present forms of tire valve, the bore of the tube being entirely clear for the passage of air in either direction. The valve mechanism is intended to be carried within the bore of an extension tube which is adapted to be removably attached to this main tube. The upper extremity of this extension tube is provided with a washer of rubber, leather or other similar material, seating against a circular shoulder formed within said main tube, by means of which an air tight joint is secured between the main tube and the extension tube. The tire can thus be inflated in the usual manner by attaching the pump to the lower terminal of the extension tube, and the tire can be deflated by simply removing the extension tube from the main tube, which allows the air to escape.

I have shown one embodiment of my invention in which the extension tube is surrounded by a sleeve, each of which is capable of rotation relatively to the other. I do not wish to be understood as limiting myself to this precise construction, but desire to claim broadly the idea of a two-part valve tube, the valve mechanism within the extension tube, and means for securing a tight joint between the two sections.

In my preferred form the bore of the main tube is of increased diameter at its outer end, and has at a suitable point a circular shoulder 10 which is adapted to form a seat for a rubber washer upon the extension tube for the purpose of securing an air tight joint. For a short distance within this shoulder the bore of the tube is preferably square or hexagonal. The extension tube comprises a straight tube 11, having at its upper end a head 12 shaped to fit within the square or hexagonal bore of the main tube. Adjoining this head is a short neck of considerably smaller diameter, about which is placed a washer 13 of rubber, leather or other similar yielding material, adapted to seat against the shoulder 10 within the main tube. Immediately adjoining this washer is a collar 14 of a diameter approximately that of the enlarged portion of the bore of the main tube. At the other extremity of the tube 11 is a threaded collar or flange 15 of somewhat greater diameter than the body of the tube. Within this end of the tube 11 the bore is enlarged to receive the valve mechanism 16, which is preferably of the usual form, permitting air to be forced in, but not permitting it to escape.

While any suitable valve mechanism may be used, I have illustrated a mechanism of the well known Schrader type, shown and described in United States Patent No. 724,128, dated March 31st, 1903. In a mechanism of this construction, the air enters through an orifice in plug 22, lifts valve proper 23 off its seat on the plug, and passes through the passage thus opened into the valve chamber. It then passes through openings 25 in spring holder 26 into the passage 27 leading to the interior of the tire. When air is not being forced through the valve, spring 24 holds valve proper 23 upon its seat and the valve is closed.

Loosely mounted upon the tube 11, and concentric therewith is the jacket or sleeve 17, held thereon by the collar 14 and by the flange 15. There is sufficient play of the sleeve upon the tube 11 to allow rotation of either relatively to the other. This sleeve has the same outer diameter, thread and shape as the main tube 5, so that when the two are attached they form a substantially continuous tube. One extremity of the sleeve consists of a threaded tip 18 of considerably less diameter than the main portion of the sleeve and adapted to engage within the outer end of the main tube which is tapped to correspond. The other extremity 19 of the sleeve I prefer to provide with flattened sides to allow the application of a wrench. Upon the threaded flange 15 I prefer to place the usual form of cap 20 or some similar form of closure, which may be provided with the tool for the removal of the valve mechanism from its case. Various methods of attaching the head 12 and the collar 14 to the tube 11 will readily suggest themselves, and some removable form must be provided in order to permit the said tube to be inserted within the sleeve.

I have shown in the drawings a form in which the collar and head consist of a single piece having its outer end terminating in a threaded tip adapted to engage within a threaded socket at the upper end of the tube 11. The said tube and head may of course be made continuous and the collar shrunk upon its inner end to secure the sleeve thereon.

The operation of my device is as follows: The main tube 5 is attached to the air tube, its head seating against the inner surface thereof. The air tube is then placed about the rim of the wheel and the tube 5 inserted in the hole in the rim and felly provided therefor. This operation is easily performed owing to the extreme shortness of the said tube. The extension tube is then attached to the main tube by inserting the threaded tip of the sleeve 17 within the threaded socket of the main tube and screwing the two firmly together, so that the washer 13 seats against the shoulder within the main tube. The joint resulting is sufficiently tight so that the air pump can be attached to the extremity of the extension tube and the tire inflated. When the tire is inflated to riding pressure the air pump is detached and the cap 20 applied. If desired the dust-cap 21 may be attached, which consists of the usual cap member swiveled in a block having a surface curved to fit the felly and an aperture shaped to fit the extension tube, or any form of nut may be used adapted to seat against the under-surface of the wheel felly and secure the extension tube in position, and lock it against rotation.

To deflate the tire the dust-cap 21 is removed, the extension tube sleeve unscrewed and the extension tube removed, which will allow the air to escape rapidly from the air tube.

The main tube and extension tube may be made of any desired length to adapt them for use with any style of felly, or with any form of dust-cap.

Having described my invention, what I claim is:

1. In a pneumatic tire valve, the combination of a main tube adapted to be secured to the air tube, an extension tube removably secured to said main tube, the outer end of said extension tube being exteriorly threaded and formed with an enlarged bore, and a complete valve mechanism entirely contained in said enlarged bore the external diameter of said extension tube being no greater than the external diameter of said main tube.

2. In a pneumatic tire valve, the combination of a main tube adapted to be secured to the air tube, a removable extension tube forming a continuation of said main tube, and an elongated sleeve surrounding the extension tube for the greater portion of its length and threaded to engage the main tube, the outer end of said extension tube being enlarged to exceed the internal diameter of said sleeve.

3. In a pneumatic tire valve, the combination of an exteriorly threaded main tube adapted to be secured to the air tube, a removable extension tube forming a continuation of said main tube, and an elongated sleeve surrounding the extension tube for the greater portion of its length and provided with a reduced tip threaded within the main tube, the body of said sleeve being of the same exterior diameter as the main tube and formed with an exterior thread.

4. In a pneumatic tire valve, the combination of a main tube adapted to be secured to the air tube, an extension tube provided with a complete valve mechanism independent of the main tube, a sleeve surrounding the extension tube and united to the main tube by a screw connection for clamping said tubes together and means for locking said sleeve against rotation.

5. In a pneumatic tire valve, the combination of a main tube adapted to be secured to the air tube, an extension tube provided with a complete valve mechanism independent of the main tube, a sleeve with flattened sides, surrounding the extension tube and united to the main tube by a screw connection for clamping said tubes together, and means for locking said sleeve against rotation comprising a block having a surface curved to fit the wheel felly and an aperture shaped to fit the said sleeve.

6. In a wheel, a felly, a pneumatic tire supported thereby, a main tube projecting inwardly from said tire, said felly being provided with an opening to receive said main tube, an extension tube removably secured to said main tube the outer portion of the bore of said extension tube being enlarged, and a complete automatic check valve mechanism entirely contained in said enlarged portion, the external diameter of said extension tube being no greater than the internal diameter of the opening in the felly.

HARRY K. RAYMOND.

Witnesses:
JAMES H. McILWAIN,
ROY KEPLER.